(12) United States Patent
Ahn et al.

(10) Patent No.: US 11,457,077 B2
(45) Date of Patent: Sep. 27, 2022

(54) SERVER OF MEDIATING A PLURALITY OF TERMINALS, AND MEDIATING METHOD THEREOF

(71) Applicant: Hyperconnect Inc., Seoul (KR)

(72) Inventors: Sang Il Ahn, Chungcheongbuk-do (KR); Hyeong Keol Nam, Seoul (KR); Seok Jun Seo, Seoul (KR); Seok Hwan Choi, Gyeonggi-do (KR); Jae Hyeuk Oh, Gyeonggi-do (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/016,064

(22) Filed: Sep. 9, 2020

(65) Prior Publication Data

US 2021/0075883 A1     Mar. 11, 2021

(30) Foreign Application Priority Data

Sep. 9, 2019 (KR) ........................ 10-2019-0111491

(51) Int. Cl.
    *G06F 15/173*    (2006.01)
    *H04L 67/306*    (2022.01)
    *H04L 67/1001*    (2022.01)

(52) U.S. Cl.
    CPC ........ *H04L 67/306* (2013.01); *H04L 67/1001* (2022.05)

(58) Field of Classification Search
    CPC ........................ H04L 67/306; H04L 67/1002
    USPC ...................................................... 709/223
    See application file for complete search history.

(56) References Cited

U.S. PATENT DOCUMENTS

| | | |
|---|---|---|
| 8,812,519 B1 | 8/2014 | Bent |
| 8,867,849 B1 | 10/2014 | Kirkham et al. |
| 9,733,811 B2 | 8/2017 | Rad et al. |
| 10,384,136 B2 | 8/2019 | Chae et al. |

(Continued)

FOREIGN PATENT DOCUMENTS

| | | |
|---|---|---|
| CN | 101827317 A | 9/2010 |
| CN | 104737097 A | 6/2015 |

(Continued)

OTHER PUBLICATIONS

Korean Office Action for Application No. 10-2019-0111491, dated Aug. 24, 2020.

(Continued)

*Primary Examiner* — Alan S Chou
(74) *Attorney, Agent, or Firm* — KPPB LLP

(57) ABSTRACT

A server may include a communication interface for receiving a plurality of profile information from a plurality of terminals; and a processor configured to divide users of the plurality of terminals into a plurality of groups based on a first criterion, to divide users of a first gender included in each group into a plurality of subgroups based on a second criterion different from the first criterion, to divide users of a second gender different from the first gender, included in each group into a plurality of matching groups to correspond to each of the plurality of subgroups, and to provide profile information of users included in each of the plurality of matching groups corresponding to each of the plurality of subgroups among the plurality of profile information to users included in each of the plurality of subgroups.

17 Claims, 9 Drawing Sheets

(56) References Cited

U.S. PATENT DOCUMENTS

| | | | |
|---|---|---|---|
| 10,599,734 | B2 | 3/2020 | Ahn et al. |
| 10,706,118 | B1 | 7/2020 | Yang et al. |
| 10,810,276 | B2 | 10/2020 | Ahn et al. |
| 10,984,488 | B1* | 4/2021 | Colucci ............ G06F 16/9536 |
| 11,296,898 | B2 | 4/2022 | Ahn et al. |
| 11,301,534 | B2 | 4/2022 | Ahn et al. |
| 2004/0076280 | A1 | 4/2004 | Ando et al. |
| 2004/0107144 | A1 | 6/2004 | Short |
| 2008/0080745 | A1* | 4/2008 | Vanhoucke ........ G06K 9/00295 |
| | | | 382/118 |
| 2009/0271244 | A1 | 10/2009 | Kalasapur et al. |
| 2011/0289433 | A1 | 11/2011 | Whalin et al. |
| 2012/0004954 | A1 | 1/2012 | Eisinger et al. |
| 2014/0040368 | A1* | 2/2014 | Janssens ............ H04L 67/306 |
| | | | 709/204 |
| 2014/0074824 | A1 | 3/2014 | Rad et al. |
| 2014/0172893 | A1 | 6/2014 | Carter |
| 2014/0280600 | A1 | 9/2014 | Jeon |
| 2015/0067070 | A1 | 3/2015 | Jacques et al. |
| 2015/0341297 | A1 | 11/2015 | Barfield, Jr. et al. |
| 2015/0352451 | A1 | 12/2015 | Brenden et al. |
| 2016/0043987 | A1* | 2/2016 | Ahn ................ H04L 67/306 |
| | | | 709/206 |
| 2016/0055571 | A1 | 2/2016 | Wouhaybi et al. |
| 2016/0127500 | A1 | 5/2016 | Rad |
| 2016/0307259 | A1 | 10/2016 | Lubeck et al. |
| 2017/0127123 | A1 | 5/2017 | Lidow et al. |
| 2017/0142482 | A1 | 5/2017 | Zhou |
| 2017/0351770 | A1 | 12/2017 | Ahn et al. |
| 2018/0046946 | A1* | 2/2018 | Mason, Jr. ............ H04W 4/021 |
| 2018/0048597 | A1 | 2/2018 | Li et al. |
| 2018/0349703 | A1 | 12/2018 | Rathod |
| 2019/0370556 | A1 | 12/2019 | Kline et al. |
| 2020/0110788 | A1 | 4/2020 | Ahn et al. |
| 2020/0145609 | A1 | 5/2020 | Ahn et al. |
| 2020/0226193 | A1 | 7/2020 | Ahn et al. |
| 2021/0011966 | A1 | 1/2021 | Ahn et al. |
| 2021/0065314 | A1* | 3/2021 | Storment ............ H04L 67/306 |
| 2021/0067362 | A1 | 3/2021 | Ahn et al. |
| 2021/0182536 | A1 | 6/2021 | Ahn et al. |
| 2021/0266498 | A1 | 8/2021 | Ahn et al. |
| 2022/0092140 | A1 | 3/2022 | Ahn et al. |

FOREIGN PATENT DOCUMENTS

| | | | |
|---|---|---|---|
| CN | 105247845 | A | 1/2016 |
| CN | 105308638 | A | 2/2016 |
| EP | 2849411 | A1 | 3/2015 |
| JP | 2002109025 | A | 4/2002 |
| JP | 2005018358 | A | 1/2005 |
| JP | 2005092897 | A | 4/2005 |
| JP | 2006197002 | A | 7/2006 |
| JP | 2008022109 | A | 1/2008 |
| JP | 2008245113 | A | 10/2008 |
| JP | 2011077909 | A | 4/2011 |
| JP | 2011081575 | A | 4/2011 |
| JP | 2013020485 | A | 1/2013 |
| JP | 2015517153 | A | 6/2015 |
| JP | 2015519852 | A | 7/2015 |
| JP | 2016076078 | A | 5/2016 |
| JP | 2017045342 | A | 3/2017 |
| JP | 2018120461 | A | 8/2018 |
| JP | 2019088004 | A | 6/2019 |
| JP | 2019149057 | A | 9/2019 |
| KR | 20000054824 | A | 9/2000 |
| KR | 20030094156 | A | 12/2003 |
| KR | 1020050111838 | A | 11/2005 |
| KR | 20060056680 | A | 5/2006 |
| KR | 20090014473 | A | 2/2009 |
| KR | 20090065147 | A | 6/2009 |
| KR | 20100023465 | A | 3/2010 |
| KR | 20110035651 | A | 4/2011 |
| KR | 20130012155 | A | 2/2013 |
| KR | 20130057936 | A | 6/2013 |
| KR | 20140087175 | A | 7/2014 |
| KR | 20150010988 | A | 1/2015 |
| KR | 10-2015-0029772 | A | 3/2015 |
| KR | 20150055634 | A | 5/2015 |
| KR | 1020150056504 | A | 5/2015 |
| KR | 101700115 | B1 | 1/2017 |
| KR | 10-2019-0077654 | A | 7/2019 |
| KR | 20190080377 | A | 7/2019 |
| WO | 0167760 | A1 | 9/2001 |
| WO | 2013081345 | A1 | 6/2013 |
| WO | 2015036817 | A1 | 3/2015 |
| WO | 2017080169 | A1 | 5/2017 |

OTHER PUBLICATIONS

Extended European Search Report for European Patent Application No. 20195016.9, dated Dec. 3, 2020.

Extended European Search Report for Application No. 20192980.9, dated Sep. 28, 2020, 8 Pgs.

Extended European Search Report for European Application No. 20214672.6, Search completed Mar. 12, 2021, dated Mar. 24, 2021, 10 Pgs.

First Office Action of corresponding Korean Patent Application 10-2016-0069563, dated Dec. 8, 2016, 9 Pgs.

International Search Report and Written Opinion for International Application No. PCT/KR2018/001315, Search completed May 16, 2021, dated May 17, 2018, 11 Pgs.

Japanese Office Action for Application No. 2020-137009, dated Aug. 12, 2021.

Korean Office Action for Application No. 10-2019-0104869, dated Jul. 21, 2020, 10 Pgs.

Office Action of corresponding Chinese Patent Application No. 2017-10407120.7, dated Aug. 5, 2019, 16 Pgs.

Bao et al., "CVAE-GAN: Fine-Grained Image Generation through Asymmetric Training", Arxiv.Org, Cornell University Library, 201 Olin Library Cornell University Ithaca, NY 14853, Mar. 29, 2017 (Mar. 29, 2017), pp. 1-15.

Iyengar et al., , "Koinophilia and human facial attractiveness", Resonance—Journal of Science Education, Indian Academy of Sciences, India, vol. 20, No. 4, May 3, 2015 (May 3, 2015), pp. 311-319.

Japanese Office Action for Application No. 2020-208565 dated Dec. 22, 2021, 3 pages.

Korean Office Action for Application No. 2020-085492051, dated Dec. 7, 2020, 6 pgs.

* cited by examiner

SERVER OF MEDIATING A PLURALITY OF TERMINALS, AND MEDIATING METHOD THEREOF

CROSS-REFERENCE TO RELATED APPLICATION

This application claims the benefit of Korean Patent Application No. 10-2019-0111491, filed on Sep. 9, 2019, in the Korean Intellectual Property Office, the disclosure of which is incorporated herein in its entirety by reference.

BACKGROUND

1. Field

The described embodiment relates to a server capable of more effectively matching a plurality of terminals with each other, and a method of mediating thereof.

2. Description of Related Art

As communication technology is developed and electronic devices are miniaturized, terminals that can be conveniently carried are widely spread to general consumers. In particular, recently, portable terminals such as smart phones or smart tablets have been widely spread. Most of the terminals have communication functions. A user can perform a search on the Internet or exchange messages with other users using a terminal.

The user and the other user may have a relationship that they already know or do not know each other. A server may connect a plurality of terminals including a user's terminal and another user's terminal to each other. The server may mediate between a plurality of terminals so that a user and another user may exchange messages with each other. The server may match a user's terminal and another user's terminal among a plurality of terminals. By doing so, the server may mediate between the user's terminal and another user's terminal. Accordingly, even when a user and another user do not know each other, a message can be exchanged with each other or a video call can be performed through mediation of the server.

SUMMARY

According to the described embodiment of the disclosure, a server capable of more effectively matching a plurality of terminals with each other, and a method of mediating the same may be provided.

In addition, according to an embodiment of the disclosure, a server capable of mediating a suitable user among users of a plurality of terminals to match a user of another terminal, and a mediating method thereof may be provided.

In addition, according to an embodiment of the disclosure, a server through which a user of each of a plurality of terminals can expand a human relationship through an intermediary service, and a method of mediating thereof may be provided.

Additional aspects will be set forth in part in the description which follows and, in part, will be apparent from the description, or may be learned by practice of the presented embodiments of the disclosure.

A method of a mediation service of a server providing an mediation service between a plurality of terminals according to an embodiment of the disclosure may include receiving a plurality of profile information from the plurality of terminals; dividing users of the plurality of terminals into a plurality of groups based on a first criterion; dividing users of a first gender included in each group into a plurality of subgroups based on a second criterion different from the first criterion; dividing users of a second gender different from the first gender, included in each group into a plurality of matching groups to correspond to each of the plurality of subgroups; and providing profile information of users included in each of the plurality of matching groups corresponding to each of the plurality of subgroups among the plurality of profile information to users included in each of the plurality of subgroups.

In some embodiments of the disclosure, the first criterion may be one of countries, cities, blood types, hobbies, and a specialties of the users of the first gender.

In some embodiments of the disclosure, the second criterion may be one of ages, hobbies, specialties, blood types, heights, and tastes of the users of the first gender.

In some embodiments of the disclosure, the users included in each of the plurality of subgroups may have the same feature based on the second criterion.

In some embodiments of the disclosure, the providing of the profile information of the users may include providing profile information of users included in a first matching group corresponding to a first subgroup among the plurality of matching groups to the users included in the first subgroup among the plurality of subgroups, wherein the users included in the first subgroup may have a first feature.

In some embodiments of the disclosure, the first matching group may include users selected based on a match history with the users of the first gender having the first feature among the users of the second gender.

In some embodiments of the disclosure, the users included in the first matching group may be selected based on a history of exchanging signs of mutual attraction with the users of the first gender having the first feature, a history of receiving signs of attraction from the users of the first gender having the first feature, a history of transmitting signs of attraction to the users of the first gender having the first feature, and a history of transmitting skip signals to the users of the first gender having the first feature.

In some embodiments of the disclosure, the first matching group may include, among the users of the second gender, first users who have exchanged signs of mutual attraction greater than or equal to a first threshold value with the users of the first gender having the first feature, second users who have received signs of attraction greater than or equal to a second threshold value from the users of the first gender having the first feature, third users who have transmitted signs of attraction greater than or equal to a third threshold value to the users of the first gender having the first feature, and fourth users who have transmitted skip signals greater than or equal to a fourth threshold value to the users of the first gender having the first feature.

In some embodiments of the disclosure, the providing of the profile information of the users may include providing profile information of the first to fourth users included in the first matching group to the users included in the first subgroup.

Meanwhile, according to an embodiment of the disclosure, a computer readable recording medium having recorded thereon a program for executing the method of providing a mediation service of a server providing a mediation service between a plurality of terminals may be provided.

A server according to an embodiment of the disclosure may include a communication interface for receiving a plurality of profile information from a plurality of terminals; and a processor configured to divide users of the plurality of terminals into a plurality of groups based on a first criterion, to divide users of a first gender included in each group into a plurality of subgroups based on a second criterion different from the first criterion, to divide users of a second gender different from the first gender, included in each group into a plurality of matching groups to correspond to each of the plurality of subgroups, and to provide profile information of users included in each of the plurality of matching groups corresponding to each of the plurality of subgroups among the plurality of profile information to users included in each of the plurality of subgroups.

In some embodiments of the disclosure, the server may further include a memory configured to store the plurality of profile information, information on the plurality of groups, and information on the plurality of matching groups.

In some embodiments of the disclosure, the processor may provide profile information of users included in a first matching group corresponding to a first subgroup among the plurality of matching groups to the users included in the first subgroup among the plurality of subgroups, wherein the users included in the first subgroup may have a first feature.

In some embodiments of the disclosure, the users included in the first matching group may be selected based on a history of exchanging signs of mutual attraction with the users of the first gender having the first feature, a history of receiving signs of attraction from the users of the first gender having the first feature, a history of transmitting signs of mutual attraction to the users of the first gender having the first feature, and a history of transmitting skip signals to the users of the first gender having the first feature.

In some embodiments of the disclosure, the first matching group may include, among the users of the second gender, first users who have exchanged signs of mutual attraction greater than or equal to a first threshold value with the users of the first gender having the first feature, second users who have received signs of attraction greater than or equal to a second threshold value from the users of the first gender having the first feature, third users who have transmitted signs of attraction greater than or equal to a third threshold value to the users of the first gender having the first feature, and fourth users who have transmitted skip signals greater than or equal to a fourth threshold value to the users of the first gender having the first feature.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
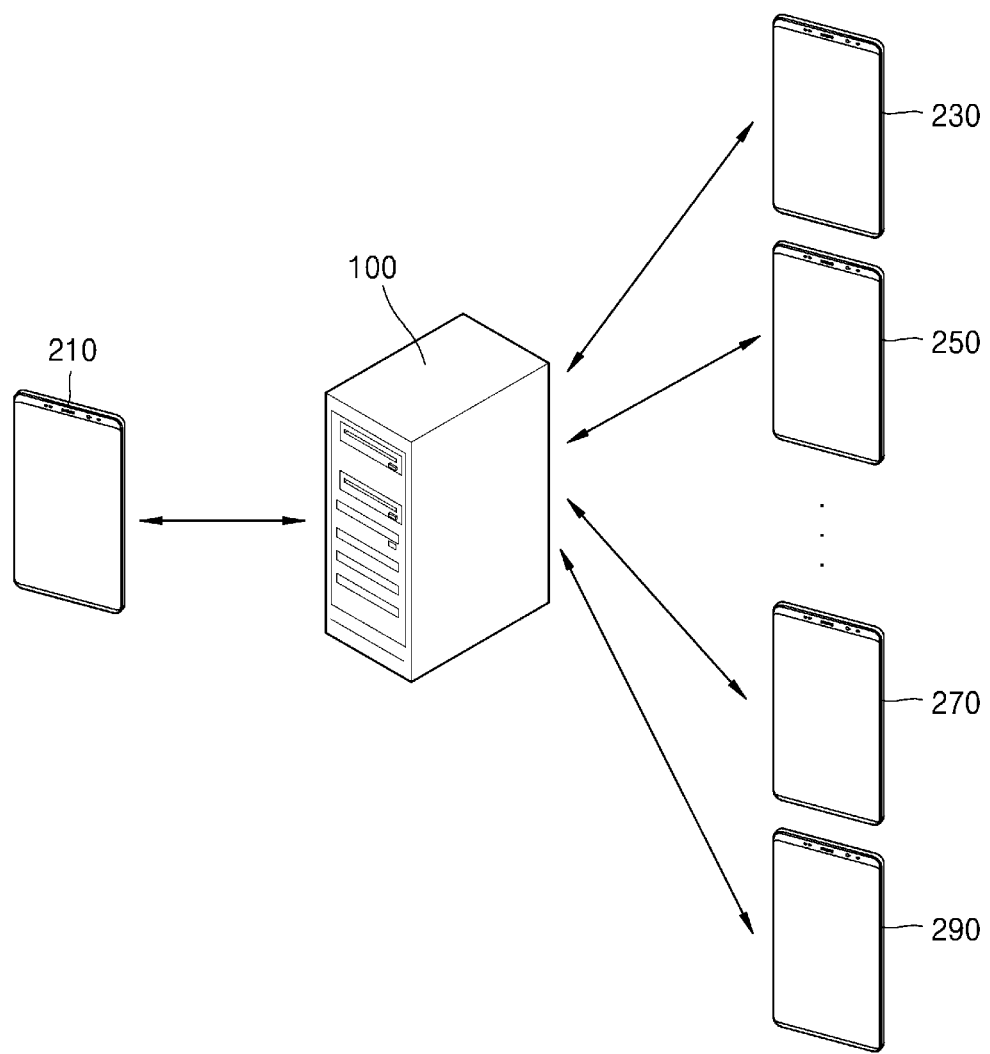
FIG. 1 is a network configuration diagram illustrating an environment of a server system in which a server operates according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure, and a method of achieving them will become apparent with reference to embodiments described below in detail together with an accompanying drawings. However, the present disclosure is not limited to the embodiments disclosed below, but will be implemented in various different forms. These embodiments are provided only to make the disclosure of the present disclosure complete, and to fully inform the scope of the disclosure to those of ordinary skill in the art to which the present disclosure belongs. The disclosure is only defined by the scope of the claims. The same reference numerals refer to the same elements throughout the specification.

Although "first" or "second" is used to describe various elements, these elements are not limited by the terms as described above. The terms as described above may be used only to distinguish one element from another element. Therefore, the first element mentioned below may be a second element within the technical idea of the present disclosure.

The terms used in the present specification are for explaining embodiments and are not intended to limit the present disclosure. In this specification, the singular form also includes the plural form unless otherwise specified in the phrase. As used in the specification, "comprises" or "comprising" is implied that the recited element or step does not exclude the presence or addition of one or more other elements or steps.

Unless otherwise defined, all terms used in the present specification may be interpreted as meanings that may be commonly understood by those of ordinary skill in the art to which the present disclosure belongs. In addition, terms defined in a commonly used dictionary are not interpreted ideally or excessively unless explicitly defined specifically.

FIG. 1 is a network configuration diagram illustrating an environment of a server system in which a server operates according to an embodiment of the present disclosure. Referring to FIG. 1, the environment of the server system may include a server 100 and a plurality of terminals 210 to 290.

The server 100 may be a mediation device connecting the plurality of terminals 210 to 290. The server 100 may provide an mediation service so that data may be transmitted and received between the plurality of terminals 210 to 290. The server 100 and the plurality of terminals 210 to 290 may be connected to a communication network. The server 100 may transmit data or receive data to the plurality of terminals 210 to 290 through the communication network.

The communication network may be implemented as one of a wired communication network, a wireless communication network, and a complex communication network. For example, the communication network may include a mobile communication network such as 3G, Long Term Evolution (LTE), and LTE-A. The communication network may include a wired or wireless communication network such as Wi-Fi, Universal Mobile Telecommunications System (UMTS)/General Packet Radio Service (GPRS), or Ethernet.

The communication network may include a local area communication network such as magnetic secure transmission (MST), radio frequency identification (RFID), and near field communication (NFC), ZigBee, Z-Wave, Bluetooth, bluetooth low energy (BLE), or infrared (IR) communication. The communication network may include a local area network (LAN), a metropolitan area network (MAN), or a wide area network (WAN).

The server 100 may receive profile information from each of the plurality of terminals 210 to 290. The profile information may include at least one of a user's picture, hobby information, gender information, country information, or age information of each of the plurality of terminals 210 to 290. The server 100 may divide users of the plurality of terminals 210 to 290 into at least one or more groups based on a specific criterion.

The server 100 may provide profile information of users of a second gender to users of a first gender included in each group. Conversely, the server 100 may provide profile information of users of the first gender to users of the second gender included in each group. The configuration of the server 100 and a method of operating the server 100 may be described in detail with reference to FIGS. 2 to 7.

Each of the plurality of terminals 210 to 290 may be connected via the server 100. For convenience of description of the present disclosure, five terminals are shown in FIG. 1. However, the number of terminals is not limited to five.

Each of the plurality of terminals 210 to 290 may be implemented as one of a desktop computer, a laptop computer, a smart phone, a smart tablet, a smart watch, a mobile terminal, a digital camera, a wearable device, or a portable electronic device. The plurality of terminals 210 to 290 may execute programs or applications. In some embodiments of the disclosure, the plurality of terminals 210 to 290 may execute an application capable of receiving a mediation service from the server 100.

In some embodiments of the disclosure, when the first terminal 210 executes the application, the first terminal 210 may receive profile information of some of the users of the second terminals 230 to 290 from the server 100. Some users belong to the same group as a user of the first terminal 210 and may have different genders from the user of the first terminal 210.

That is, the user of the first terminal 210 may be provided with profiles of some of the users of the second terminals 230 to 290 and may perform communication. Through such a mediation service, a human relationship of the user of the first terminal 210 may be expanded.

Figure 2:
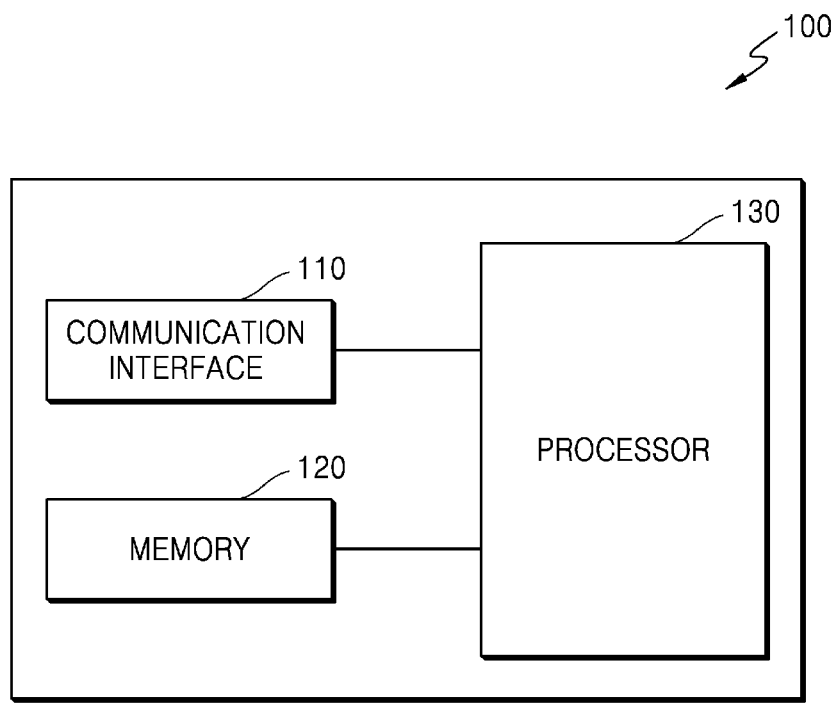
FIG. 2 is a block diagram illustrating a configuration of a server according to an embodiment of the present disclosure.

FIG. 2 is a block diagram illustrating a configuration of a server according to an embodiment of the present disclosure. Referring to FIGS. 1 and 2, the server 100 may include a communication interface 110, a memory 120, and a processor 130.

The communication interface 110 may transmit data to the outside of the server 100 or may receive data from the outside of the server 100. In more detail, the communication interface 110 may transmit data to the plurality of terminals 210 to 290 or may receive data from the plurality of terminals 210 to 290. The communication interface 110 may transmit the received data to at least one of the memory 120 and the processor 130. For example, the data may include at least one of profile information, Global Positioning System (GPS) information, signs of attraction generated based on the profile information, and a skip signal.

For example, the communication interface 110 may include a remote network input/output interface such as a 3G module, an LTE module, an LTE-A module, a Wi-Fi module, a WiGig module, an ultra wide band (UWB) module, or a LAN card. In addition, the communication interface 110 may include a short-range network input/output interface such as a magnetic secure transmission module, a Bluetooth module, an NFC module, an RFID module, a ZigBee module, a Z-Wave module, or an infrared module. In addition, the communication interface 110 may include other network input/output interfaces.

The memory 120 may store data received from at least one of the communication interface 110 and the processor 130. In addition, the memory 120 may provide the stored data to at least one of the communication interface 110 and the processor 130.

The memory 120 may be implemented using nonvolatile memory. For example, the nonvolatile memory may be implemented using one of a flash memory, a read only memory (ROM), a random access memory (RAM), an electrically erasable ROM (EEROM), an erasable programmable ROM (EPROM), electrically erasable programmable ROM (EEPROM), and a hard disk drive (HDD). Alternatively, the memory 120 may further include a volatile memory such as dynamic random access memory (DRAM) and static RAM (SRAM). Also, the memory 120 may be managed using a database scheme.

The processor 130 may control the overall operation of the server 100. For example, the processor 130 may control the operation of the communication interface 110 and the memory 120.

The processor 130 may manage profile information of each of users of the plurality of terminals 210 to 290. The processor 130 may store profile information received from the communication interface 110 in the memory 120. Alternatively, the processor 130 may read profile information stored in the memory 120 and output the profile information through the communication interface 110. The processor 130 may read profile information stored in the memory 120 based on the operation result. Alternatively, the processor 130 may randomly read some of the profile information stored in the memory 120. Alternatively, the processor 130 may read profile information of a user who wishes to provide his or her profile information to other users.

In some embodiments of the disclosure, the processor 130 may divide users of the plurality of terminals 210 to 290 into at least one group based on profile information of each of the users of the plurality of terminals 210 to 290 and a first criterion. The processor 130 may provide profile information of users of the second gender to users of the first gender included in each group. Conversely, the processor 130 may provide profile information of users of the first gender to users of the second gender included in each group.

In some embodiments of the disclosure, when providing profile information of users of the second gender to users of the first gender included in each group, the processor 130 may divide users of the first gender included in each group into a plurality of subgroups based on a second criterion.

Further, the processor 130 may divide users of the second gender included in each group into a plurality of matching groups to correspond to each of the plurality of subgroups. The processor 130 may provide profile information of users included in a plurality of matching groups corresponding to each of the plurality of subgroups to users included in each of the plurality of subgroups.

A detailed operation method of the processor 130 may be described with reference to FIGS. 3 to 7.

Figure 3:
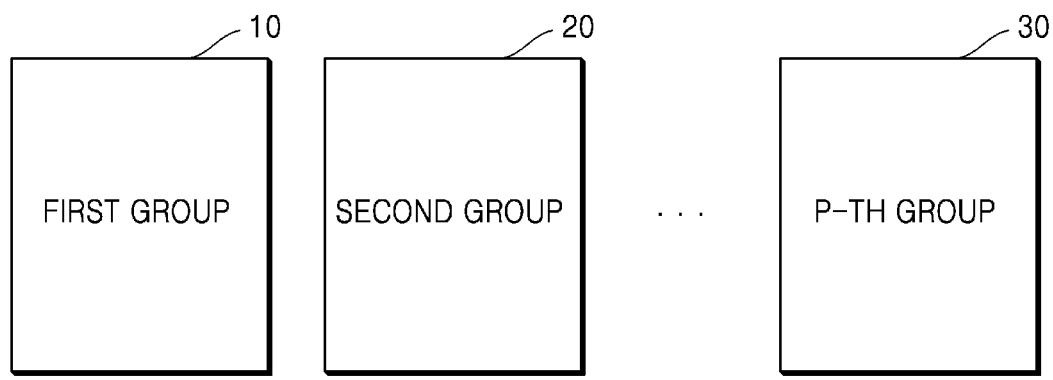
FIG. 3 is a diagram illustrating a method of dividing users of terminals using a mediation service into at least one group according to an embodiment of the present disclosure.

FIG. 3 is a diagram illustrating a method of dividing users of terminals using a mediation service into at least one group according to an embodiment of the present disclosure.

Referring to FIGS. 2 and 3, the processor 130 of the server 100 may divide users of a plurality of terminals 210 to 290 into a plurality of groups 10 to 30 based on a first criterion. In some embodiments of the disclosure, the first criterion may be one of a country, a city, a blood type, a hobby, and a specialty. The first criterion is not limited to the examples presented.

In some embodiments of the disclosure, users of the plurality of terminals 210 to 290 may be classified into at least one group based on real-time GPS information of each of the plurality of terminals 210 to 290.

For example, a first group 10 may correspond to Seoul, the second group 20 may correspond to Busan, and the Pth group 30 may correspond to Jeju Island. The processor 130 may divide users of the plurality of terminals 210 to 290 into each group based on the received GPS information. In more detail, among users of the plurality of terminals 210 to 290, users whose GPS information corresponds to Seoul may be classified into the first group 10. Next, among users of the plurality of terminals 210 to 290, users whose GPS information corresponds to Busan may be classified into a second group 20. Lastly, among users of the plurality of terminals 210 to 290, users whose GPS information corresponds to Jeju Island may be classified into the Pth group 30.

The type of group is not limited to the presented embodiment, and a plurality of groups 10 to 30 may be set to correspond to countries such as Korea, the United States, and Japan, respectively. Alternatively, the plurality of groups 10 to 30 may be set to correspond to hobbies such as exercise, music, and reading, respectively. Alternatively, the plurality of groups 10 to 30 may respectively correspond to blood types such as A type, B type AB type, and O type.

In some embodiments of the disclosure, the processor 130 may store information on a user of a terminal included in each of the plurality of groups 10 to 30 and the plurality of groups 10 to 30 in the memory 120.

Figure 4:
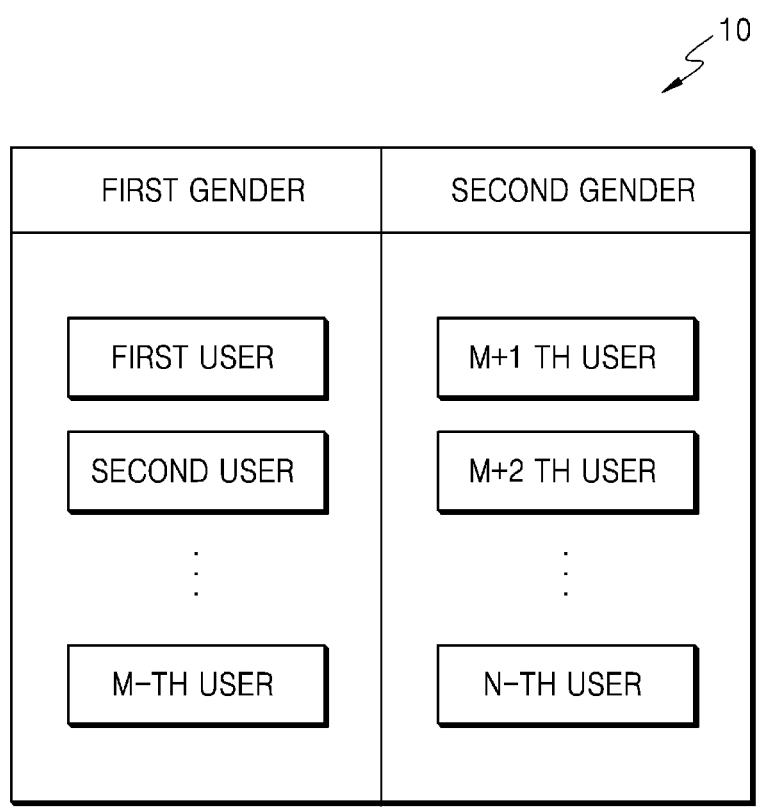
FIG. 4 is a diagram illustrating a configuration of users included in each group according to an embodiment of the present disclosure.

FIG. 4 is a diagram illustrating a configuration of users included in each group according to an embodiment of the present disclosure.

Referring to FIGS. 2 to 4, users included in the first group 10 may be classified into a first gender and a second gender. However, unlike shown, in addition to the first and second genders, there may be more types of genders such as a third or a fourth gender. This is because gender may be classified based on physical characteristics, or based on gender identity considering gender minorities. In addition, users classified by gender may be not only users corresponding to each gender, but also users who prefer or avoid each gender. For example, a user classified by the first gender may be a user corresponding to the first gender or a user who prefers or avoids the first gender. In some embodiments of the disclosure, in the first group 10, first to m-th users of the first gender may be included, and m+1 to n-th users of the second gender may be included. For example, when the first gender is female, the second gender may be male. Conversely, when the first gender is male, the second gender may be female.

In some embodiments of the disclosure, each of the second group 20 to the P-th group 30 illustrated in FIG. 3 may be implemented similarly to or identical to the first group 10 illustrated in FIG. 4. However, users included in each of the plurality of groups 10 to 30 may be different. For example, users included in the first group 10 cannot be included in the second group 20 to the P-th group 30. Similarly, users included in the second group 20 cannot be included in the first group 10 to the P-th group 30 except for the second group 20.

Figure 5:
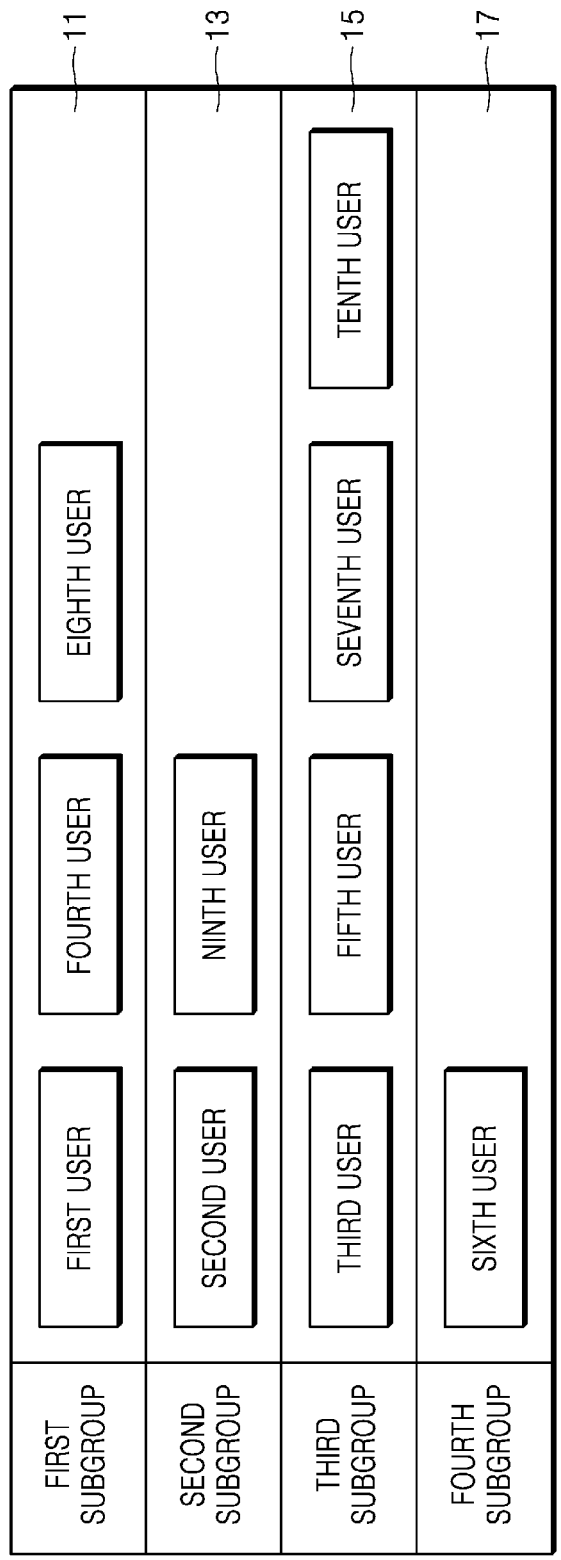
FIG. 5 is a diagram illustrating a method of dividing users of a specific gender into subgroups according to an embodiment of the present disclosure.

FIG. 5 is a diagram illustrating a method of dividing users of a specific gender into subgroups according to an embodiment of the present disclosure.

Referring to FIGS. 2 to 5, the processor 130 may divide first to m-th users of the first gender or m+1 to n-th users of the second gender into a plurality of subgroups based on the second criterion.

In some embodiments of the disclosure, the processor 130 may divide the first to m-th users of the first gender into a plurality of subgroups, and it may be assumed that the first to m-th users are ten. In addition, it may be assumed that the number of subgroups is four. The number of first to m th users and the number of subgroups are not be limited to the disclosed embodiment.

In some embodiments of the disclosure, a first subgroup 11 may include a first user, a fourth user, and an eighth user, and the second subgroup 13 may include a second user and a ninth user. In addition, the third subgroup 15 may include a third user, a fifth user, a seventh user, and a tenth user, and the fourth subgroup 17 may include a sixth user.

In some embodiments of the disclosure, the second criterion may be one of an age, a hobby, a specialty, a blood type, a height, and a taste. The second criterion is not be limited to the examples presented.

In some embodiments of the disclosure, the first criterion and the second criterion may be different from each other. For example, when the first criterion is a hobby, the second criterion may be selected from other criteria except for the hobby.

In some embodiments of the disclosure, when the first gender is male and the second criterion is age, the first user, the fourth user, and the eighth user of the first subgroup 11 may be male users in their 20s, respectively, and the second user and the ninth user of the second subgroup 13 may be male users in their 30s, respectively. And, the third user, the fifth user, the seventh user, and the tenth user of the third subgroup 15 are male users in their 40s, respectively, and the sixth user of the fourth subgroup 17 may include male users in their 50s.

That is, the processor 130 according to an embodiment of the disclosure may divide users having the same features into one subgroup based on the second criterion. In some embodiments of the disclosure, when the second criterion is age, the twenties may be defined as a first feature, the thirties as a second feature, the thirties as a third feature, and the forties as a fourth feature.

In embodiments of the present disclosure, the first criterion or the second criterion may include one or more criteria. When the first criterion includes a plurality of criteria, the plurality of criteria may be regarded as components constituting the first criterion. When the second criterion includes a plurality of criteria, the plurality of criteria may be regarded as components constituting the second criterion. Since the description of the first criterion may be applied to the second criterion as it is, the description of the second criterion is replaced with the following description of the first criterion for convenience of description.

For example, the first criterion may include one criterion of 'country' or may include a total of three criteria 'country, blood type, and hobby'. With respect to at least one criterion included in the first criterion, users may be divided into a plurality of groups according to whether each of the users satisfies each criterion. Based on the first criterion, one user may be included exclusively in one group or may be included in multiple groups.

When there are a plurality of criteria included in the first criterion, a different weight or probability may be applied to each criterion, and as a result of such application, when a value of the result is equal to or greater than a predetermined reference value, the result may be treated as satisfying the first criterion. For example, it may be assumed the first criterion includes 'country, blood type, and hobbies', and a weight or probability of '0.5', '0.3', '0.2' is applied to each, and the predetermined reference value for determining whether the first criterion is satisfied is '0.6'. Under such an assumption, when a user meets the 'country and blood type', or the 'country and hobby', or both 'country, blood type, and hobby', included in the first criterion, the user may become a user who meets the first criterion because the value of weight or probability is higher than a predetermined reference value. On the other hand, when a user does not meet the 'country' included in the first criterion, even if the user meets both 'blood type and hobby' included in the first criterion, the user cannot become a user who meets the first criterion because it is lower than the predetermined criterion.

Meanwhile, the first criterion and the second criterion may serve as a classification criterion for dividing users into a plurality of groups, or a filtering criterion for filtering users who do not meet the first criterion and the second criterion.

For the first criterion and the second criterion, different weights or possibilities may be applied. The first criterion and the second criterion may have an equal relationship, may be a parallel relationship to which different weights or possibilities are applied, or may be a hierarchical relationship to be considered sequentially.

The weight of each criterion may be preset to a value, determined by an algorithm, or trained by an artificial intelligence learning model, for generating an optimal matching.

Figure 6:
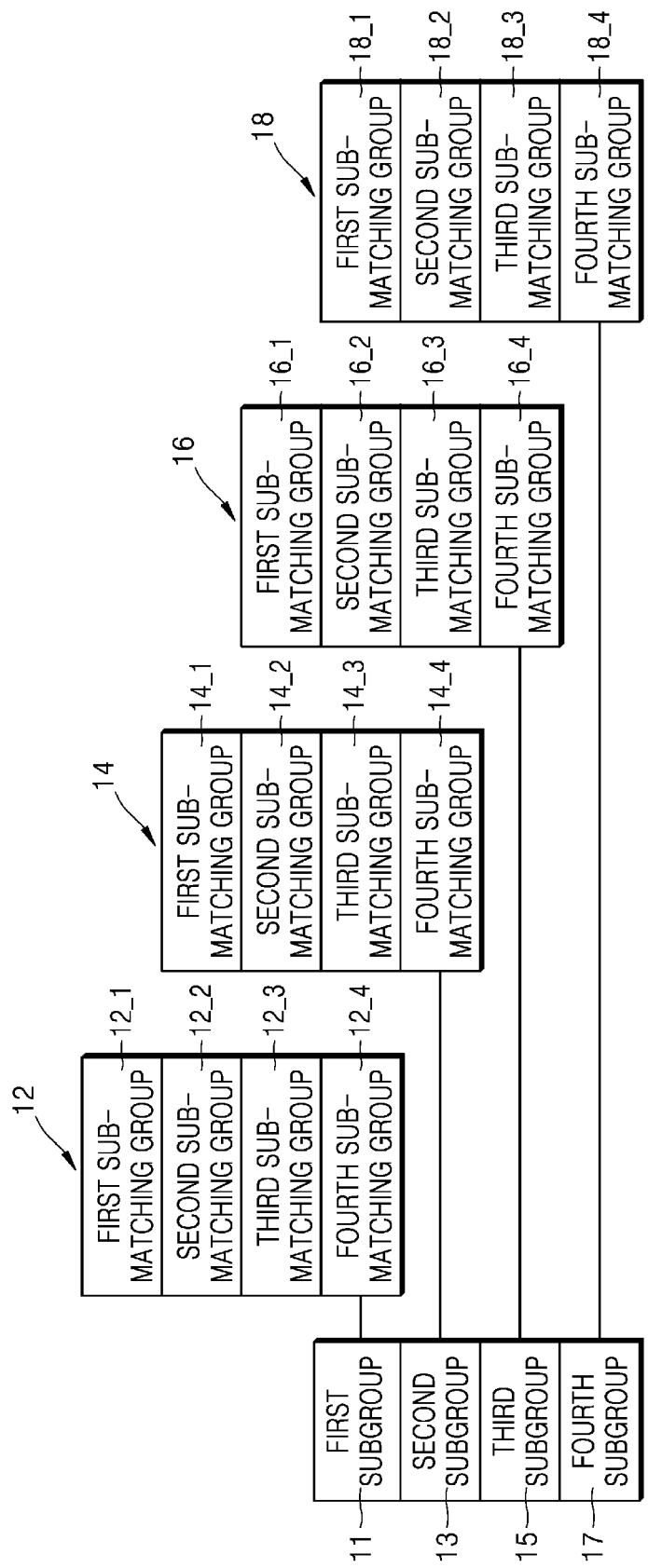
FIG. 6 is a diagram illustrating a method of dividing users of a specific gender into matching groups according to an embodiment of the present disclosure.

FIG. 6 is a diagram illustrating a method of dividing users of a specific gender into matching groups according to an embodiment of the present disclosure.

Referring to FIGS. 2 to 6, the processor 130 may divide the m+1 th to n-th users of the second gender into a plurality of matching groups, excluding the first to m-th users of the first gender divided into a plurality of subgroups. The m+1 th to n-th users may be classified into a plurality of matching groups based on the past match history of the m+1 th to n-th users.

In some embodiments of the disclosure, the first matching group 12 may correspond to the first subgroup 11, and the second matching group 14 may correspond to the second subgroup 13. In addition, the third matching group 16 may correspond to the third subgroup 15, and the fourth matching group 18 may correspond to the fourth subgroup 17.

In some embodiments of the disclosure, the processor 130 may select users belonging to the first matching group 12 based on the past match history with users having a first feature among the plurality of users. For example, users included in the first matching group 12 may be selected based on a history of exchanging signs of mutual attraction with users having the first feature, a history of receiving signs of attraction from users having the first feature, a history of transmitting signs of attraction to users having the first feature, and a history of transmitting skip signals to users having the first feature, among the m+1 th to n-th users of the second gender included in the first group 10. The higher a degree of attraction according to a history based on the sign of attraction, the higher a probability of matching between users included in each subgroup and users included in each matching group, and the higher a degree of unattraction according to the history based on the skip signal, the lower the probability of matching between users included in each subgroup and users included in each matching group In some embodiments of the disclosure, the processor 130 may cause users having the first feature among the m+1 th to n-th users of the second gender and users who have exchanged signs of mutual attraction greater than or equal to a first threshold value to be included in a first sub-matching group 12_1. As another embodiment of the disclosure, the processor 130 may cause users who have transmitted signs of attraction greater than or equal to a second threshold to users having the first feature among the m+1 the to n-th users of the second gender to be included in a second sub-matching group 12_2.

As another embodiment of the disclosure, the processor 130 may cause users who have received signs of attraction greater than or equal to a third threshold from users having the first feature among the m+1 th to n-th users of the second gender to be included in a third sub-matching group 12_3. As another embodiment of the disclosure, the processor 130 may cause users who have transmitted skip signals greater than or equal to a fourth threshold to users having the first feature among the m+1 th to n-th users of the second gender to be included in a fourth sub-matching group 12_4.

In some embodiments of the disclosure, users included in the second matching group 14 may be selected based on a history of exchanging signs of mutual attraction with users having a second feature, a history of receiving signs of attraction from users having the second feature, a history of transmitting signs of attraction to users having the second feature, and a history of transmitting skip signals to users having the second feature, among the m+1 th to n-th users of the second gender included in the first group 10.

In some embodiments of the disclosure, the processor 130 may cause users having the second feature among the m+1 th to n-th users of the second gender and users who have transmitting and receiving the sing of attraction greater than or equal to a first threshold value to be included in a first sub-matching group 14_1. As another embodiment of the disclosure, the processor 130 may cause users who have transmitted signs of attraction greater than or equal to a second threshold to users having the second feature among the m+1 the to n-th users of the second gender to be included in a second sub-matching group 14_2.

As another embodiment of the disclosure, the processor 130 may cause users who have received signs of attraction greater than or equal to a third threshold from users having the second feature among the m+1 th to n-th users of the second gender to be included in a third sub-matching group 14_3. As another embodiment of the disclosure, the processor 130 may cause users who have transmitted skip signals greater than or equal to a fourth threshold to users having the second feature among the m+1 th to n-th users of the second gender to be included in a fourth sub-matching group 14_4.

In some embodiments of the disclosure, users included in the third matching group 16 may be selected based on a history of exchanging signs of mutual attraction with users having the third feature, a history of receiving signs of attraction from users having the third feature, a history of transmitting signs of attraction to users having the third feature, and a history of transmitting skip signals to users having the third feature, among the m+1 th to n-th users of the second gender included in the first group 10.

In some embodiments of the disclosure, the processor 130 may cause users having the third feature among the m+1 th to n-th users of the second gender and users who have exchanged signs of mutual attraction greater than or equal to a first threshold value to be included in a first sub-matching group 16_1. As another embodiment of the disclosure, the processor 130 may cause users who have transmitted signs of attraction greater than or equal to a second threshold to users having the third feature among the m+1 the to n-th users of the second gender to be included in a second sub-matching group 16_2.

As another embodiment of the disclosure, the processor 130 may cause users who have received signs of attraction greater than or equal to a third threshold from users having the third feature among the m+1 th to n-th users of the second gender to be included in a third sub-matching group 16_3. As another embodiment of the disclosure, the processor 130 may make users who have transmitted skip signals greater than or equal to a fourth threshold to users having the third feature among the m+1 th to n-th users of the second gender to be included in a fourth sub-matching group 16_4.

In some embodiments of the disclosure, users included in the fourth matching group 18 may be selected based on a history of exchanging signs of mutual attraction with users having the fourth feature, a history of receiving signs of attraction from users having the fourth feature, a history of transmitting signs of attraction to users having the fourth feature, and a history of transmitting skip signals to users having the fourth feature, among the m+1 th to n-th users of the second gender included in the first group 10.

In some embodiments of the disclosure, the processor 130 may cause users having the fourth feature among the m+1 th to n-th users of the second gender and users who have exchanged signs of mutual attraction greater than or equal to a first threshold value to be included in a first sub-matching group 18_1. As another embodiment of the disclosure, the processor 130 may make users who have transmitted signs of attraction greater than or equal to a second threshold to users having the fourth feature among the m+1 the to n-th users of the second gender to be included in a second sub-matching group 18_2.

As another embodiment of the disclosure, the processor 130 may make users who have received signs of attraction greater than or equal to a third threshold from users having the fourth feature among the m+1 th to n-th users of the second gender to be included in a third sub-matching group 18_3. As another embodiment of the disclosure, the processor 130 may make users who have transmitted skip signals greater than or equal to a fourth threshold to users having the fourth feature among the m+1 th to n-th users of the second gender to be included in a fourth sub-matching group 18_4.

In some embodiments of the disclosure, the processor 130 may transmit profile information of users included in the first matching group 12 to terminals of users included in the first subgroup 11. Alternatively, the processor 130 may transmit profile information of some users included in each of the first to fourth sub-matching groups 12_1 to 12_4 to each of the terminals of users included in the first subgroup 11.

As another embodiment of the disclosure, the processor 130 may transmit profile information of users included in the second matching group 14 to terminals of users included in the second subgroup 13. Alternatively, the processor 130 may transmit profile information of some users included in each of the first to fourth sub-matching groups 14_1 to 14_4 to each of the terminals of users included in the second subgroup 13.

As another embodiment of the disclosure, the processor 130 may transmit profile information of users included in the third matching group 16 to terminals of users included in the third subgroup 15. Alternatively, the processor 130 may transmit profile information of some users included in each of the first to fourth sub-matching groups 16_1 to 16_4 to each of the terminals of users included in the third subgroup 15.

As another embodiment of the disclosure, the processor 130 may transmit profile information of users included in the fourth matching group 18 to terminals of users included in the fourth subgroup 17. Alternatively, the processor 130 may transmit profile information of some users included in each of the first to fourth sub-matching groups 18_1 to 18_4 to each of the terminals of users included in the fourth subgroup 17.

In some embodiments of the disclosure, the processor 130 may transmit profile information included in each of a plurality of matching groups 12, 14, 16, and 18 to each of a plurality of subgroups 11, 13, 15, and 17 so that the profile information included in each of the plurality of matching groups 12, 14, 16, and 18 is sequentially displayed on terminals of users included in each of the plurality of subgroups 11, 13, 15, and 17.

Figure 7:
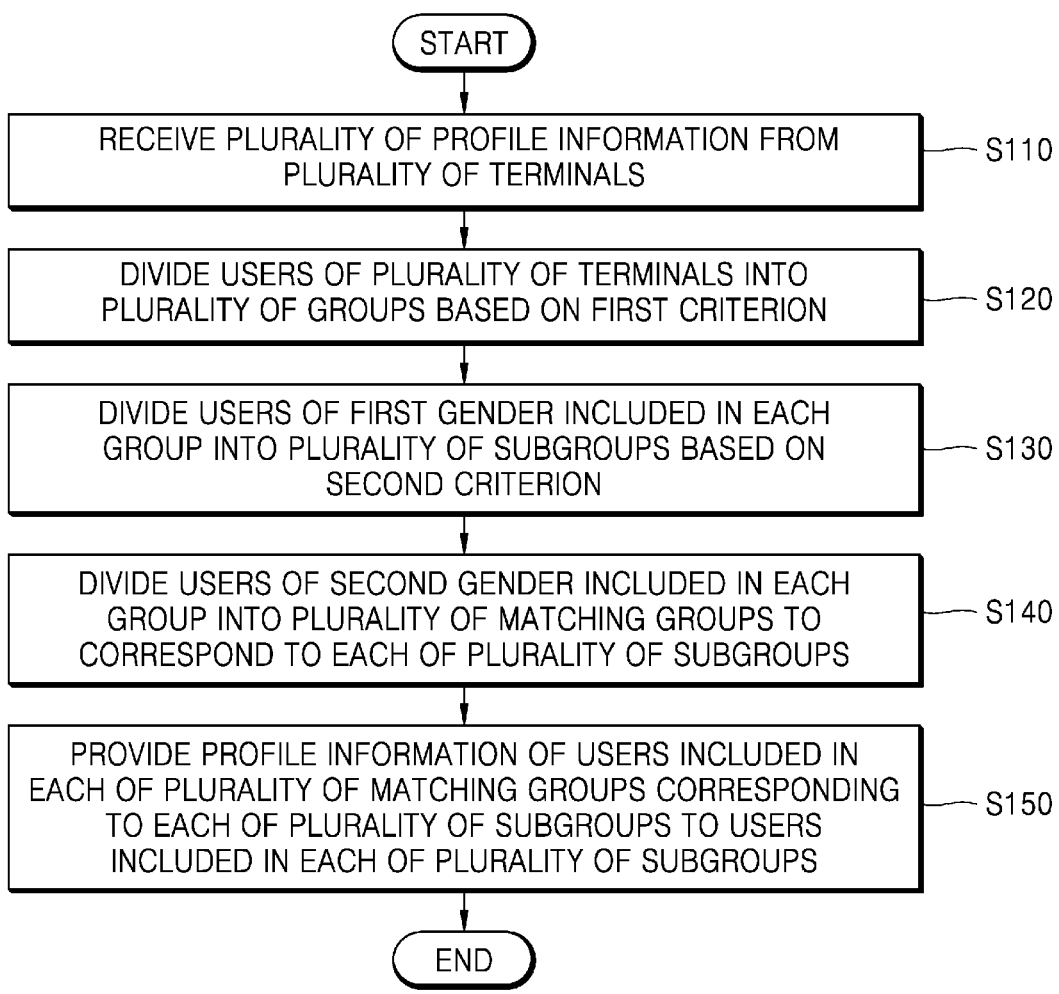
FIG. 7 is a flow chart illustrating a method of operating a server according to an embodiment of the present disclosure.

FIG. 7 is a flow chart illustrating a method of operating a server according to an embodiment of the present disclosure.

Referring to FIGS. 1 to 7, in step S110, the communication interface 110 of the server 100 may receive a plurality of profile information from a plurality of terminals 210 to 290. Each of the plurality of profile information may include at least one of a user's photo, hobby information, gender information, country information, and age information of each of the plurality of terminals 210 to 290.

In step S120, the processor 130 of the server 100 may divide users of the plurality of terminals 210 to 290 into a plurality of groups 10 to 30 based on the first criterion. A method by which the processor 130 divides users of a plurality of terminals 210 to 290 into a plurality of groups 10 to 30 based on the first criterion may be similar to or identical to the method described with reference to FIGS. 3 and 4.

In step S130, the processor 130 of the server 100 may divide users of the first gender included in each group into a plurality of subgroups 11, 13, 15, and 17 based on the second criterion. A method by which the processor 130 divides users of the first gender included in the group into a plurality of subgroups 11, 13, 15, and 17 may be similar to or identical to the method described with reference to FIG. 5.

In step S140, the processor 130 of the server 100 may divide users of the second gender included in each group into a plurality of matching groups 12, 14, 16, and 18 to correspond to each of the plurality of subgroups 11, 13, 15, and 17. A method of generating the plurality of matching groups 12, 14, 16, and 18 by the processor 130 may be similar to or identical to the method described with reference to FIG. 6.

In step S150, the processor 130 of the server 100 may provide profile information of users included in each of the plurality of matching groups corresponding to each of the plurality of subgroups to users included in each of the plurality of subgroups 11, 13, 15, and 17. In some embodiments of the disclosure, the processor 130 of the server 100 may provide all or partial profile information of users included in each of the plurality of matching groups corresponding to each of the plurality of subgroups to users included in each of the plurality of subgroups 11, 13, 15, and 17.

Figure 8:
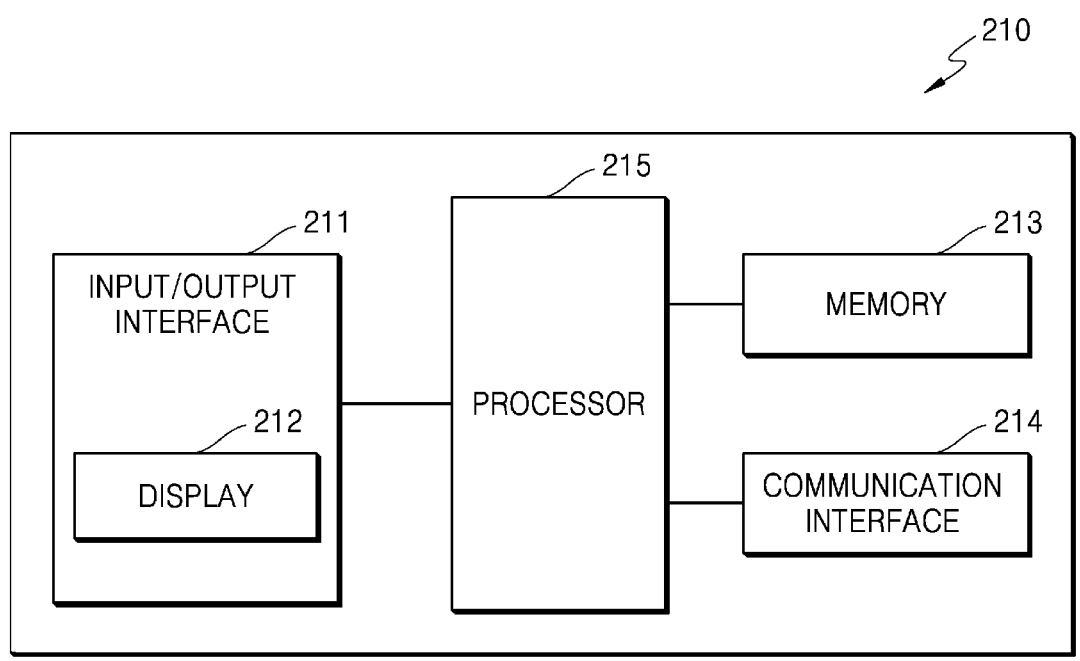
FIG. 8 is a diagram illustrating the configuration of a terminal according to another embodiment of the present disclosure.

FIG. 8 is a diagram showing the configuration of a terminal according to another embodiment of the present disclosure.

Referring to FIGS. 1 to 6 and 8, the first terminal 210 may include an input/output interface 211, a display 212, a memory 213, a communication interface 214, and a processor 215. Each of the second to fifth terminals 230 to 290 shown in FIG. 1 may be implemented similarly or identically to the first terminal 210.

The input/output interface 211 may receive a signal from the outside. The input/output interface 211 may receive a signal from the user of the first terminal 210. Also, the input/output interface 211 may receive a signal from an external device. The input/output interface 211 may include, for example, a microphone, a camera, a keyboard, a mouse, a trackball, a touch screen, a button, a switch, a sensor, a network interface, or other input device. The input/output interface 211 may receive a voice from the outside through a microphone included in the input/output interface 211.

In addition, the input/output interface 211 may receive an image or an image captured from a camera (not shown) included in the input/output interface 211 or receive a gesture from a user of the first terminal 210.

The input/output interface 211 may include a display 212. For example, the display 212 may include a flat panel display device such as a liquid crystal display (LCD), an organic light emitting diode (OLED), or a plasma display panel (PDP). The display 212 may include a curved display or a flexible display. The display 212 may include a touch screen. When the display 212 includes a touch screen, the display 212 may receive a touch input from the user of the first terminal 210.

The display 212 may display data. Alternatively, the display 212 may display the result of the operation performed by the processor 215. Alternatively, the display 212 may display data stored in the memory 213. The display 212 may display data received through the input/output interface 211 or data received through the communication interface 214.

In some embodiments of the disclosure, the display 212 may sequentially display a plurality of profile information in an order determined by the processor 215. As another embodiment of the disclosure, the display 212 may sequentially display a plurality of profile information according to the order received from the server 100. As another embodiment of the disclosure, the display 212 may randomly display a plurality of profile information.

In some embodiments of the disclosure, when an application providing a mediation service is executed in the first terminal 210, the display 212 may output a plurality of profile information received from the server 100. The display 212 may sequentially output a plurality of profile information. In some embodiments of the disclosure, the plurality of profile information may be information provided from users included in one of the plurality of matching groups 12, 14, 16, and 18.

The display 212 may receive a specific input from a user for each of a plurality of profile information sequentially displayed. For example, the specific input may be an input indicating a favor for a user of a terminal corresponding to each of a plurality of profile information. Alternatively, the specific input may be an input that is skipped to view other profile information without showing a favor for the displayed profile information.

In some embodiments of the disclosure, when an application providing a mediation service is executed in the first terminal 210, the input/output interface 211 may receive profile information or user input received from the user of the first terminal 210. For example, the user's profile information may include at least one of a picture, hobby information, gender information, country information, and age information of the user of the first terminal 210. In addition, the user's profile information may further include a video captured by the user. In addition, the user input may be a touch input received from a user of the first terminal 210.

The memory 213 may store data. The memory 213 may store voice data, image data, or user profile information received from the input/output interface 211. In addition, the memory 213 may store a result of an operation performed by the processor 215. For example, the memory 213 may store voice encoded by the processor 215. The memory 213 may store data to be output to the outside through the communication interface 214 or may store data received from the outside through the communication interface 214.

The memory 213 may store software or programs. For example, the memory 213 may store an application, a program such as an application programming interface (API), and various types of data. The memory 213 may store several instructions executable by the processor 215.

The memory 213 may include at least one of a volatile memory or a nonvolatile memory. The memory 213 may include, for example, at least one of flash memory, ROM, RAM, EEROM, EPROM, EEPROM, hard disk drive, or register. The memory 213 may include, for example, a file system, a database, or an embedded database.

The communication interface 214 may output data to the outside of the first terminal 210 or may receive data from the outside. The communication interface 214 may output data to the server 100 or an external device. The communication interface 214 may receive data from the server 100 and an external device. The communication interface 214 may output an operation result performed by the processor 215 to the outside.

In some embodiments of the disclosure, when an input indicating a favor for a user of a terminal corresponding to each of the plurality of profile information is received on the display 212, the communication interface 214 may output a sign of attraction. Alternatively, when an input being skipped to view other profile information is received without showing a favor for the profile information displayed on the display 212, the communication interface 214 may output a skip signal.

The communication interface 214 may include a remote network interface such as, for example, a 3G module, an LTE module, an LTE-A module, a Wi-Fi module, a WiGig module, a UWB (Ultra Wide Band) module, or a LAN card. In addition, the communication interface 214 may include a short-range network interface such as a magnetic security output (MST) module, a Bluetooth module, an NFC module, an RFID module, a ZigBee module, a Z-Wave module, or an infrared module. Additionally, the communication interface 214 may include other network interfaces.

In some embodiments of the disclosure, the communication interface 214 may receive a plurality of profile information from the server 100. The plurality of profile information may be information selected based on a specific criterion of the server 100. In some embodiments of the disclosure, the plurality of profile information may be profile information of users selected based on match history with users having the same features as the user of the first terminal 210. The plurality of profile information may be selected in the manner described based on FIGS. 3 to 7.

The processor 215 or each of the components included in the processor 215 may be implemented in the form of software or hardware. For example, the software may be implemented as program execution instructions such as machine code, firmware code, embedded code, and application. The hardware may be an electrical and electronic circuit, a processor, a computer, a pressure sensor, an inertial sensor, MEMS, passive components, or a combination thereof.

The processor 215 may control the operation of the first terminal 210. The processor 215 may be connected to each of the components included in the first terminal 210 and may control the operation of each component included in the first terminal 210. The processor 215 may control the operation of the first terminal 210 in response to a signal received by the input/output interface 211.

In some embodiments of the disclosure, the processor 215 may determine an order in which a plurality of profile information is displayed through the display. In some embodiments of the disclosure, the processor 215 may control the display 212 to be displayed in the order of profile information of users selected based on a history of exchanging signs of mutual attraction with users having the same features as the user of the first terminal 210, profile information of users selected based on a history of receiving signs of attraction from users having the same features as the user of the first terminal 210, and profile information of users selected based on a history of transmitting signs of attraction to users having the same features as the user of the first terminal 210, and profile information of users selected based on a history of transmitting skip signals to users having the same features as the user of the first terminal 210.

The method of displaying a plurality of profile information on the display 212 is not limited to the above-described embodiment of the disclosure. The processor 215 may control a plurality of profile information to be displayed on the display 212 in various order combinations.

Figure 9:
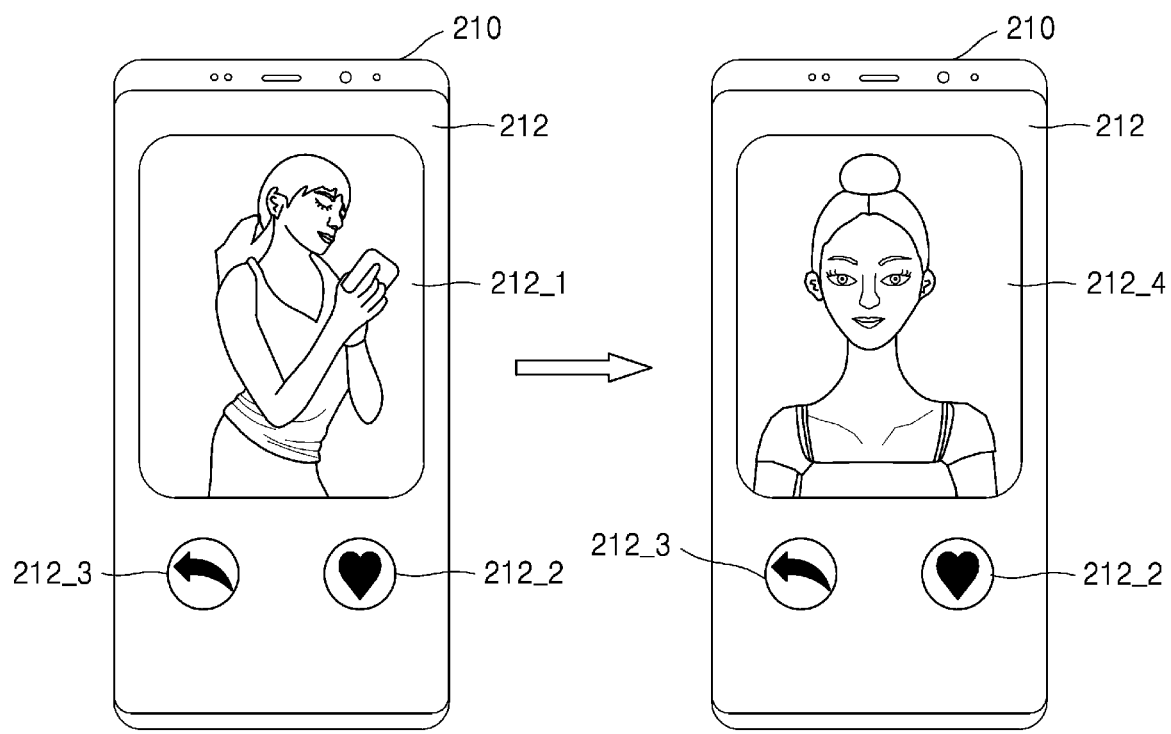
FIG. 9 is a diagram illustrating a method of displaying profile information on a terminal according to an embodiment of the present disclosure.

FIG. 9 is a diagram illustrating a method of displaying profile information on a terminal according to an embodiment of the present disclosure.

Referring to FIGS. 8 and 9, the first terminal 210 may sequentially display a plurality of profile information included in the received profile group.

The first profile information 212_1 among a plurality of profile information may be displayed on a partial area of the display 212 of the first terminal 210. In some embodiments of the disclosure, an attraction icon 212_2 and a skip icon 212_3 may be displayed in a partial area of the display 212.

The user of the first terminal 210 may select one of the attraction icon 212_2 and the skip icon 212_3 based on the first profile information 212_1. When the user of the first terminal 210 wants to communicate one-on-one with the user who provided the first profile information 212_1, the attraction icon 212_2 may be selected.

In some embodiments of the disclosure, when an input of touching the attraction icon 212_2 to the first terminal 210 is received, a sign attraction is generated, and the generated sign of attraction may be transmitted to the server 100. As another embodiment of the disclosure, when the user of the first terminal 210 does not want to perform one-to-one communication with the user who provided the first profile information 212_1, the skip icon 212_3 may be selected.

In some embodiments of the disclosure, the user of the first terminal 210 may select one of the attraction icon 212_2 and the skip icon 212_3 based on the first profile information 212_1.

When an input for selecting one of the attraction icon 212_2 and the skip icon 212_3 is received from the user of the first terminal 210, the second profile information 212_4 may be displayed on the display 212 instead of the first profile information 212_1

Referring to FIGS. 1 to 9, the server 100 and the plurality of terminals 210 to 290 according to an embodiment of the disclosure may more effectively match each other. In addition, the server 100 may mediate a suitable user among users of the plurality of terminals 210 to 290 to match users of other terminals. In addition, the server 100 may mediate so that users of each of the plurality of terminals 210 to 290 may expand human relationships through a mediation service.

The embodiments described above may also be implemented in the form of a recording medium including instructions executable by a computer such as a program module executed by a computer. Computer-readable media may be any available media that may be accessed by a computer, and may include both volatile and non-volatile media, removable and non-removable media.

Further, the computer-readable medium may include a computer storage medium. Computer storage media may include volatile, nonvolatile, removable and non-removable media implemented in any method or technology for storage of information such as computer readable instructions, data structures, program modules or other data. Communication media typically include computer readable instructions, data structures, program modules, or other data of a modulated data signal such as a carrier wave, or other transmission mechanism, and may include any information delivery medium.

According to the described embodiment of the disclosure, a server capable of more effectively matching a plurality of terminals with each other, and a method of mediating the same may be provided.

In addition, according to an embodiment of the disclosure, a server capable of mediating a suitable user among users of a plurality of terminals to match a user of another terminal, and a mediating method thereof may be provided.

In addition, according to an embodiment of the disclosure, a server through which a user of each of a plurality of terminals can expand a human relationship through an intermediary service, and a method of mediating thereof may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of providing a mediation service of a server providing a mediation service between a plurality of terminals, the method comprising:
   receiving, at a communication interface of the server using at least one processor, a plurality of profile information from the plurality of terminals;
   dividing, using the processor, users of the plurality of terminals into a plurality of groups based on a first criterion, wherein the first criterion includes a first plurality of criteria of which a different weight is applied to each criterion in the first plurality of criteria;
   dividing, using the processor, users of a first gender included in each group into a plurality of subgroups based on a second criterion different from the first criterion, wherein the second criterion includes a second plurality of criteria of which a different weight is applied to each criterion in the second plurality of criteria;
   dividing, using the processor, users of a second gender, different from the first gender, included in each group into a plurality of matching groups based on a degree of attraction according to a matching history with the users of the first gender included in each of the plurality of subgroups, wherein each matching group of the plurality of matching groups corresponds to a subgroup of the plurality of subgroups;
   providing, using the processor, profile information of users included in each of the plurality of matching groups corresponding to each of the plurality of subgroups among the plurality of profile information to terminals of the users included in each of the plurality of subgroups; and
   mediating communication between at least two terminals of the plurality of terminals based on the profile information provided to the terminals of the users included in each of the plurality of subgroups.

2. The method of claim 1, wherein the first criterion is one of a country, cities, blood types, hobbies, and specialties of the users of the first gender.

3. The method of claim 1, wherein the second criterion is one of ages, hobbies, specialties, blood types, heights, and tastes of the users of the first gender.

4. The method of claim 1, wherein the users included in each of the plurality of subgroups have the same feature based on the second criterion.

5. The method of claim 4, wherein the providing of the profile information of the users comprises
   providing profile information of users included in a first matching group corresponding to a first subgroup among the plurality of matching groups to the users included in the first subgroup among the plurality of subgroups,
   wherein the users included in the first subgroup have a first feature.

6. The method of claim 5, wherein the first matching group includes users selected based on a match history with the users of the first gender having the first feature among the users of the second gender.

7. The method of claim 6, wherein the users included in the first matching group are selected based on at least one of a history of exchanging signs of mutual attraction with the users of the first gender having the first feature, a history of receiving signs of attraction from the users of the first gender having the first feature, a history of transmitting signs of attraction to the users of the first gender having the first feature, and a history of transmitting signs of unattraction to the users of the first gender having the first feature.

8. The method of claim 7, wherein the first matching group includes, among the users of the second gender, first users who have exchanged signs of mutual attraction greater than or equal to a first threshold value with the users of the first gender having the first feature, second users who have received signs of attraction greater than or equal to a second threshold value from the users of the first gender having the first feature, third users who have transmitted signs of attraction greater than or equal to a third threshold value to the users of the first gender having the first feature, and fourth users who have transmitted signs of unattraction greater than or equal to a fourth threshold value to the users of the first gender having the first feature.

9. The method of claim 8, wherein the providing of the profile information of the users comprises providing profile information of the first to fourth users included in the first matching group to the users included in the first subgroup.

10. The method of claim 1, wherein the first criterion has a first weight and the second criterion has a different second weight.

11. A non-transitory computer-readable recording medium having recorded thereon a program for executing the method of claim 1.

12. A server comprising:
    a communication interface for receiving a plurality of profile information from a plurality of terminals; and
    a processor configured to:
       divide users of the plurality of terminals into a plurality of groups based on a first criterion, wherein the first criterion includes a first plurality of criteria of which a different weight is applied to each criterion in the first plurality of criteria;
       divide users of a first gender included in each group into a plurality of subgroups based on a second criterion different from the first criterion, wherein the second criterion includes a second plurality of criteria of which a different weight is applied to each criterion in the second plurality of criteria;
       divide users of a second gender different from the first gender, included in each group into a plurality of matching groups based on a degree of attraction according to a matching history with the users of the first gender included in each of the plurality of subgroups, wherein each matching group of the plurality of matching groups corresponds to a subgroup of the plurality of subgroups;
       provide profile information of users included in each of the plurality of matching groups corresponding to each of the plurality of subgroups among the plurality of profile information to terminals of the users included in each of the plurality of subgroups; and
       mediate communication between at least two terminals of the plurality of terminals based on the profile information provided to the terminals of the users included in each of the plurality of subgroups.

13. The server of claim 12, further comprising: a memory configured to store the plurality of profile information, information on the plurality of groups, and information on the plurality of matching groups.

14. The server of claim 12, wherein the processor provides profile information of users included in a first matching group corresponding to a first subgroup among the plurality of matching groups to the users included in the first subgroup among the plurality of subgroups, wherein the users included in the first subgroup have a first feature.

15. The server of claim 14, wherein the users included in the first matching group are selected based on at least one of a history of exchanging signs of mutual attraction with the users of the first gender having the first feature, a history of receiving signs of attraction from the users of the first gender having the first feature, a history of transmitting signs of attraction to the users of the first gender having the first feature, and a history of transmitting signs of unattraction to the users of the first gender having the first feature.

16. The server of claim 15, wherein the first matching group includes, among the users of the second gender, first users who have exchanged signs of mutual attraction greater than or equal to a first threshold value with the users of the first gender having the first feature, second users who have received signs of attraction greater than or equal to a second threshold value from the users of the first gender having the first feature, third users who have transmitted signs of attraction greater than or equal to a third threshold value to the users of the first gender having the first feature, and fourth users who have transmitted signs of unattraction greater than or equal to a fourth threshold value to the users of the first gender having the first feature.

17. The server of claim 12, wherein the first criterion has a first weight and the second criterion has a different second weight.

* * * * *